United States Patent
Huang et al.

(10) Patent No.: US 12,320,995 B2
(45) Date of Patent: Jun. 3, 2025

(54) ELECTRONIC DEVICE

(71) Applicant: ASUSTEK COMPUTER INC., Taipei (TW)

(72) Inventors: Chienyi Huang, Taipei (TW); Chao-Shun Wang, Taipei (TW); Chun-Mao Tseng, Taipei (TW); Yan-Jhang Cheng, Taipei (TW); Chi Liu, Taipei (TW); Min Che Kao, Taipei (TW); Lu-Chien Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 506 days.

(21) Appl. No.: 17/939,688

(22) Filed: Sep. 7, 2022

(65) Prior Publication Data
US 2023/0236343 A1 Jul. 27, 2023

(30) Foreign Application Priority Data

Jan. 26, 2022 (CN) .......................... 202210094547.7

(51) Int. Cl.
*G02B 5/02* (2006.01)
*G09F 13/08* (2006.01)

(52) U.S. Cl.
CPC ......... *G02B 5/0294* (2013.01); *G02B 5/0278* (2013.01); *G02B 5/0284* (2013.01); *G09F 13/08* (2013.01)

(58) Field of Classification Search
None
See application file for complete search history.

(56) References Cited

U.S. PATENT DOCUMENTS

2012/0218752 A1* 8/2012 Sumitani ........... G02F 1/133605
362/296.01
2014/0333873 A1* 11/2014 Hyung .............. G02F 1/133606
349/64

(Continued)

FOREIGN PATENT DOCUMENTS

CN 104009262 B 11/2016
CN 107179819 B 6/2021

(Continued)

*Primary Examiner* — Derek S. Chapel
(74) *Attorney, Agent, or Firm* — MUNCY, GEISSLER, OLDS & LOWE, P.C.

(57) ABSTRACT

The disclosure provides an electronic device including a housing, a light-emitting element and a light diffusion structure. The housing includes a first light-transmitting hole and a second light-transmitting hole. The light-emitting element is disposed in the housing, and is aligned with the first light-transmitting hole. The light diffusion structure includes a first light diffusion layer and a second light diffusion layer. The first light diffusion layer is disposed between the housing and the light-emitting element, and comprises a first semi-transparent region and a first light-shielding region. The first semi-transparent region corresponds to the first light-transmitting hole, and the first light-shielding region surrounds the first semi-transparent region. The second light diffusion layer is disposed between the housing and the light-emitting element, and comprises a second semi-transparent region and a second light-shielding region. The second semi-transparent region corresponds to the second light-transmitting hole. The second light-shielding region surrounds the second semi-transparent region.

14 Claims, 6 Drawing Sheets

(56) References Cited

U.S. PATENT DOCUMENTS

2017/0160591 A1* 6/2017 Cho .................. G02F 1/133606
2021/0180770 A1* 6/2021 Tseng ...................... F21V 11/14

FOREIGN PATENT DOCUMENTS

| CN | 114069745 A | 2/2022 |
| CN | 113258596 B | 4/2022 |
| CN | 109935920 B | 5/2022 |

* cited by examiner

ELECTRONIC DEVICE

CROSS-REFERENCE TO RELATED APPLICATION

This application claims the priority benefit of Chinese application serial No. 202210094547.7, filed on Jan. 26, 2022. The entirety of the above-mentioned patent application is hereby incorporated by reference herein and made a part of the specification.

BACKGROUND OF THE INVENTION

Field of the Invention

The disclosure relates to an electronic device and, more particularly, to an electronic device that can generate a light emitting effect on a housing.

Description of the Related Art

To highlight the uniqueness of a product, an electronic device (such as a notebook computer) often uses a light emitting pattern to generate a light emitting effect on a housing.

A plurality of openings are usually formed on a housing of a conventional electronic device, and a plurality of light sources matching the quantity of the openings are disposed inside the housing to emit light toward the openings respectively. Various light emitting patterns are generated by controlling the light sources, to produce a light emitting effect. However, image quality of the light emitting patterns depends on distribution density of the openings. If the opening density is increased without increasing the quantity of corresponding light sources, the openings are likely to have uneven brightness. Conversely, if the quantity of light sources is increased in accordance with the opening density, the internal temperature of a system will become excessively high, and the manufacturing cost will also be increased.

BRIEF SUMMARY OF THE INVENTION

The disclosure provides an electronic device. The electronic device includes a housing, a light-emitting element and a light diffusion structure. The housing includes a first light-transmitting hole and a second light-transmitting hole. The light-emitting element is disposed in the housing, and is aligned with the first light-transmitting hole. The light diffusion structure includes a first light diffusion layer and a second light diffusion layer. The first light diffusion layer is disposed between the housing and the light-emitting element, and comprises a first semi-transparent region and a first light-shielding region. The first semi-transparent region corresponds to the first light-transmitting hole, and the first light-shielding region surrounds the first semi-transparent region. The second light diffusion layer is disposed between the housing and the light-emitting element, and comprises a second semi-transparent region and a second light-shielding region. The second semi-transparent region corresponds to the second light-transmitting hole, and the second light-shielding region surrounds the second semi-transparent region.

The electronic device according to the disclosure uses the first light diffusion layer and the second light diffusion layer to effectively disperse light generated by the light-emitting element to the first light-transmitting hole and the second light-transmitting hole to transmit the light outward. In this manner, a small number of light-emitting elements are used for achieving ideal image quality, thereby avoiding a high temperature inside a system, and also helping to reduce manufacturing cost.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
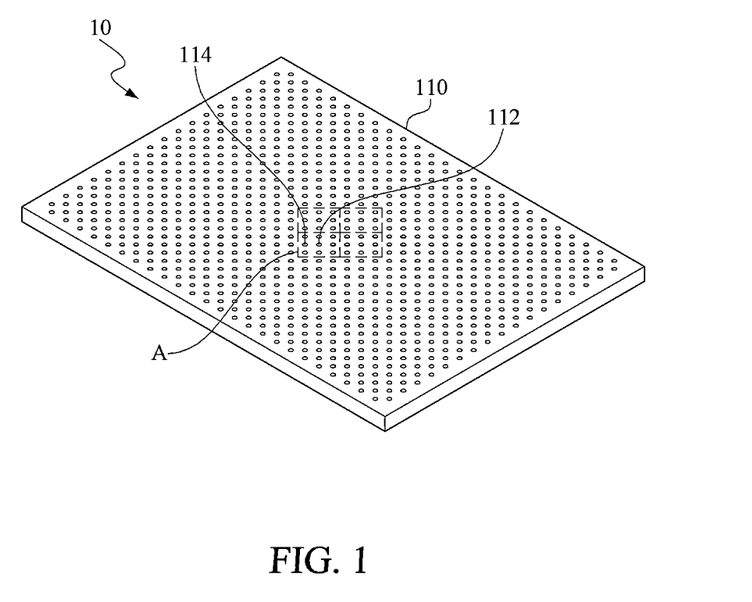
FIG. 1 is a schematic diagram of an appearance of an embodiment of an electronic device according to the disclosure.

FIG. 1 is a schematic diagram of an appearance of an embodiment of an electronic device according to the disclosure. An electronic device 10 may be a notebook computer, a tablet computer, a smart phone, or other electronic products that can be decorated with light emitting effects.

As shown in FIG. 1, a housing 110 of the electronic device 10 can be divided into a plurality of light-emitting units A arranged in an array, and each light-emitting unit A corresponds to a first light-transmitting hole 112 on the housing 110 and at least one second light-transmitting hole 114 adjacent to the first light-transmitting hole 112. The housing 110 is an opaque housing, such as a metal housing.

Figure 2:
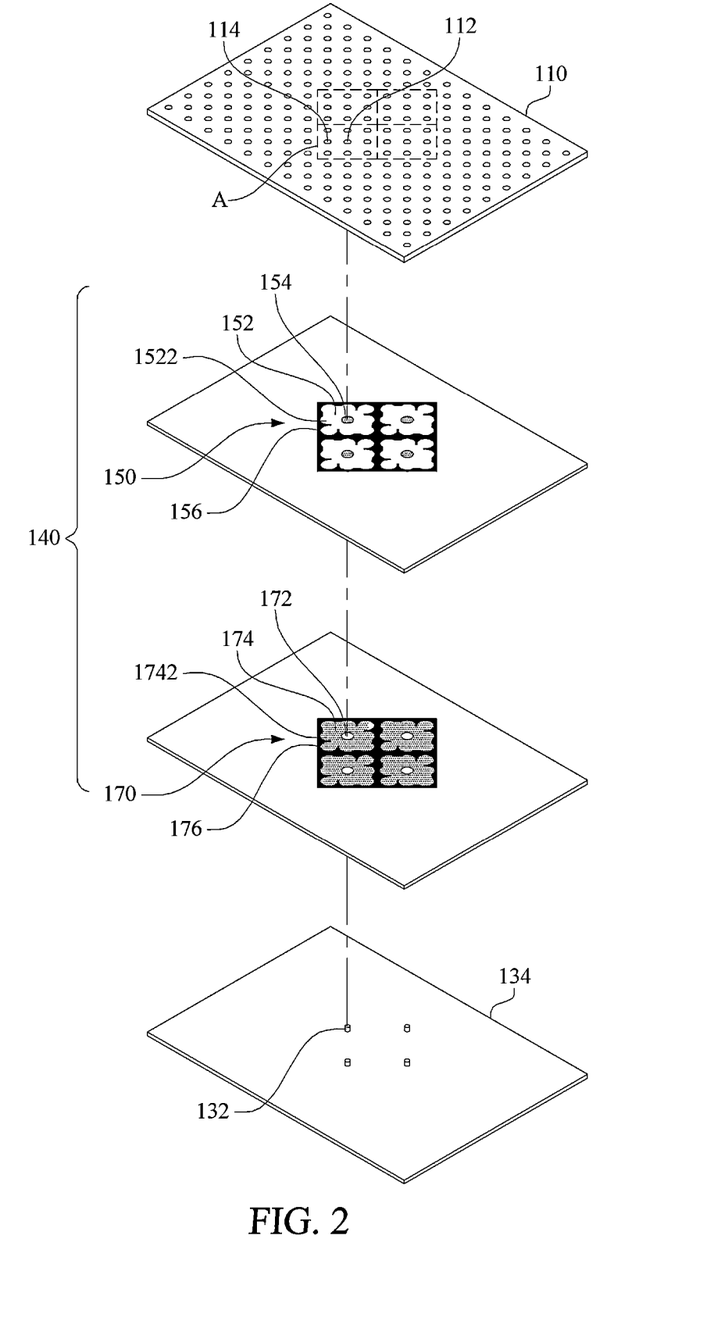
FIG. 2 is an exploded view showing an embodiment of an internal structure of a light-emitting unit of an electronic device according to the disclosure.

In an embodiment, as shown in FIG. 1 and FIG. 2, each light-emitting unit A corresponds to one first light-transmitting hole 112 and eight second light-transmitting holes 114 surrounding the first light-transmitting hole 112, to define a square region. The first light-transmitting hole 112 is located at the center of the square region, and the second light-transmitting hole 114 is located on the periphery of the square region.

It is worth noting that the quantity of second light-transmitting holes 114 in each light-emitting unit A is adjusted according to requirements (such as density and distribution manners of the light-transmitting holes, intensity of a single light source, or the like).

In an embodiment, the second light-transmitting holes 114 are symmetrically distributed around the first light-transmitting holes 112, so as to present a uniform light emitting effect.

FIG. 2 is an exploded view showing an embodiment of an internal structure of the light-emitting unit A of the electronic device according to the disclosure. In the figure, four light-emitting units A are used as an example, and the quantity of light-emitting units A is adjusted according to requirements.

A plurality of light-emitting elements 132 are located in the housing 110, and are arranged in an array on a circuit board 134. The light-emitting units A each correspond to a light-emitting element 132. Each light-emitting element 132 is aligned with one first light-transmitting hole 112 on the housing 110. In an embodiment, the light-emitting element 132 is a light-emitting diode element.

The light diffusion structure 140 is disposed between the housing 110 and the light-emitting element 132, and includes a first light diffusion layer 150 and a second light diffusion layer 170. The first light diffusion layer 150 includes a first light-transmitting region 152, a first semi-transparent region 154, and a first light-shielding region 156. The first semi-transparent region 154 corresponds to the first light-transmitting hole 112, and the first light-shielding region 156 surrounds the first semi-transparent region 154. The first light-transmitting region 152 is located between the first semi-transparent region 154 and the first light-shielding region 156, and corresponds to the second light-transmitting hole 114.

The second light diffusion layer 170 is disposed between the first light diffusion layer 150 and the light-emitting element 132, and includes a second light-transmitting region 172, a second semi-transparent region 174 and a second light-shielding region 176. The second light-transmitting region 172 corresponds to the first light-transmitting hole 112. The second semi-transparent region 174 corresponds to the second light-transmitting hole 114 and surrounds the second light-transmitting region 172, and the second light-shielding region 176 surrounds the second semi-transparent region 174.

In the embodiment of FIG. 2, the first light diffusion layer 150 is provided with the first light-transmitting region 152 at a position corresponding to the second light-transmitting hole 114. However, the disclosure is not limited thereto. In other embodiments, the first light-transmitting region 152 is replaced with the first semi-transparent region 154, to simplify design of the first light diffusion layer 150. In addition, in an embodiment of FIG. 2, the second light diffusion layer 170 is provided with the second light-transmitting region 172 at a position corresponding to the first light-transmitting hole 112. However, the disclosure is not limited thereto. In other embodiments, the second semi-transparent region 174 can also be used for replacing the second light-transmitting region 172, to simplify design of the second light diffusion layer 170.

In an embodiment, the first semi-transparent region 154 is a circular region, and is aligned with the first light-transmitting hole 112. The first light-transmitting region 152 includes eight circular regions 1522 aligned with the eight second light-transmitting holes 114 respectively. The eight circular regions 1522 are connected to each other, or independent of each other.

In an embodiment, the second light-transmitting region 172 is a circular region, and is aligned with the first light-transmitting hole 112. The second semi-transparent region 174 includes eight circular regions 1742 aligned with the eight second light-transmitting holes 114 respectively. The eight circular regions 1742 are connected to each other, or independent of each other.

Figure 3:
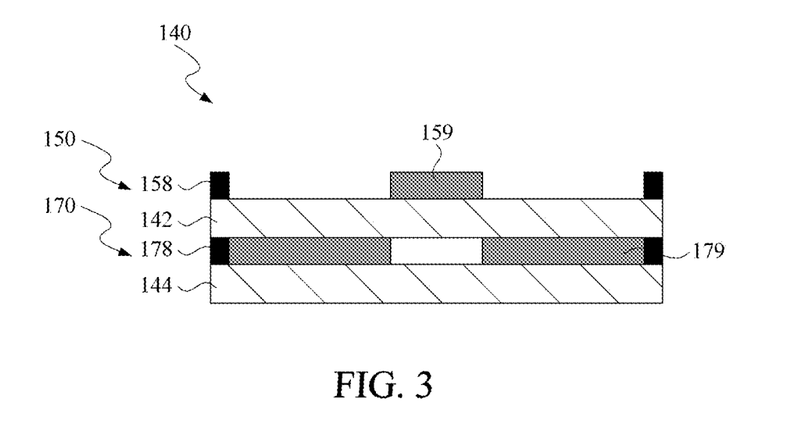
FIG. 3 is a schematic cross-sectional view of an embodiment of a light diffusion structure according to the disclosure.

FIG. 3 is a schematic cross-sectional view of an embodiment of a light diffusion structure 140 according to the disclosure.

As shown in FIG. 3, the light diffusion structure 140 includes a first light-transmitting film 142 and a second light-transmitting film 144 as base materials of the first light diffusion layer 150 and the second light diffusion layer 170. The first light diffusion layer 150 includes a light-shielding pattern layer 158 and a semi-transparent reflective pattern layer 159. The light-shielding pattern layer 158 and the semi-transparent reflective pattern layer 159 are located on a same side of the first light-transmitting film 142. The light-shielding pattern layer 158 defines the first light-shielding region 156 in FIG. 2, the semi-transparent reflective pattern layer 159 defines the first semi-transparent region 154 in FIG. 2, and a part that is not covered with the light-shielding pattern layer 158 and the semi-transparent reflective pattern layer 159 is the first light-transmitting region 152. Compared with the light-shielding pattern layer 158, the semi-transparent reflective pattern layer 159 has a higher reflection coefficient and higher transmission coefficient for visible light. In an embodiment, the semi-transparent reflective pattern layer 159 is a silver ink layer, and the light-shielding pattern layer 158 is a black ink layer.

In this embodiment, the light-shielding pattern layer 158 and the semi-transparent reflective pattern layer 159 are located on a same side of the first light-transmitting film 142, or located on opposite sides of the first light-transmitting film 142.

The second light diffusion layer 170 includes a light-shielding pattern layer 178 and a semi-transparent pattern layer 179. The light-shielding pattern layer 178 and the semi-transparent pattern layer 179 are located on a same side of the second light-transmitting film 144. The light-shielding pattern layer 178 defines the second light-shielding region 176 in FIG. 2, the semi-transparent pattern layer 179 defines the second semi-transparent region 174 in FIG. 2, and a part that is not covered with the light-shielding pattern layer 178 and the semi-transparent pattern layer 179 is the second light-transmitting region 172. Compared with the light-shielding pattern layer 178, the semi-transparent pattern layer 179 has a higher transmission coefficient for visible light. In an embodiment, the semi-transparent pattern layer 179 is a white ink layer, and the light-shielding pattern layer 178 is a black ink layer.

In this embodiment, the light-shielding pattern layer 178 and the semi-transparent pattern layer 179 are located on a same side of the second light-transmitting film 144, or located on opposite sides of the second light-transmitting film 144.

In an embodiment, compared with the semi-transparent reflective pattern layer 159 of the first light diffusion layer 150, the semi-transparent pattern layer 179 of the second light diffusion layer 170 has a lower reflection coefficient for visible light.

In an embodiment, the light-shielding pattern layer 158 on the first light diffusion layer 150 and the light-shielding pattern layer 178 on the second light diffusion layer 170 are made of a same ink material.

In this embodiment, the semi-transparent reflective pattern layer 159 of the first light diffusion layer 150 and the semi-transparent pattern layer 179 of the second light diffusion layer 170 are made of different ink materials or a same ink material.

In addition, in the embodiment of FIG. 3, the first light diffusion layer 150 and the second light diffusion layer 170 are located on the first light-transmitting film 142 and the second light-transmitting film 144 respectively. However, the disclosure is not limited thereto.

Figure 4:
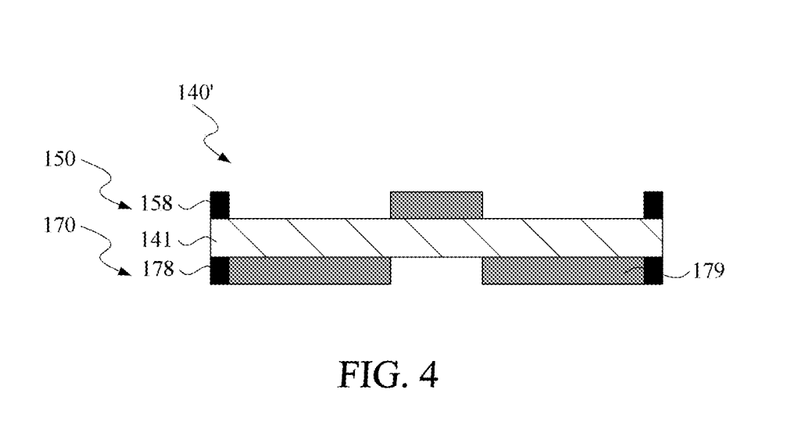
FIG. 4 is a schematic cross-sectional view of another embodiment of a light diffusion structure according to the disclosure.

FIG. 4 is a schematic cross-sectional view of another embodiment of the light diffusion structure according to the disclosure. As shown in FIG. 4, the first light diffusion layer 150 and the second light diffusion layer 170 in a light diffusion structure 140' are located on opposite sides of a single light-transmitting film 141, rather than on two light-transmitting films.

Figure 5:
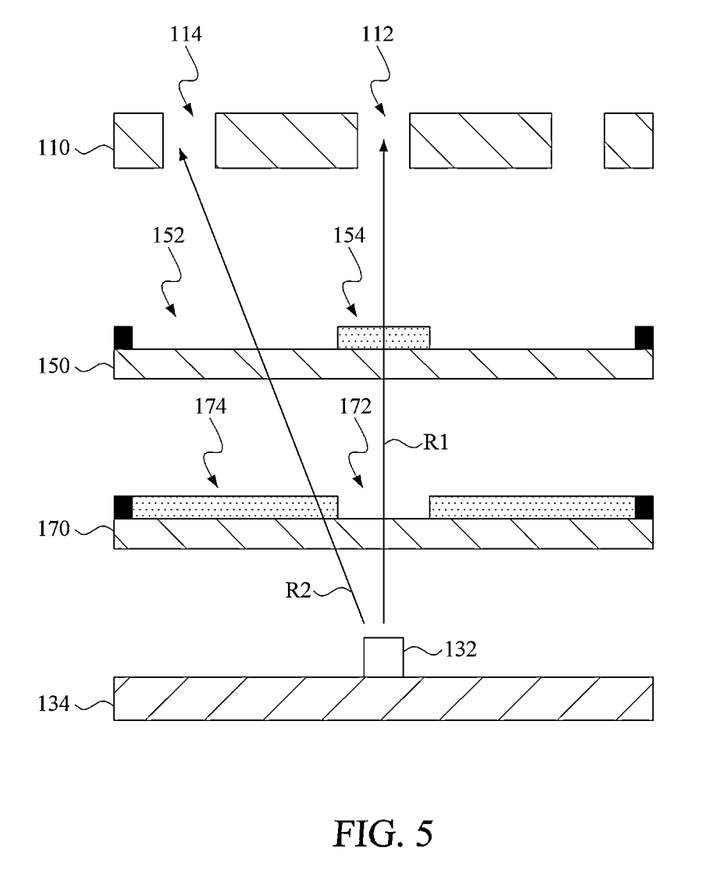
FIG. 5 is a cross-sectional view showing an internal structure and a light path of the light-emitting unit in FIG. 2.

FIG. 5 is a cross-sectional view showing an internal structure of the light-emitting unit A in FIG. 2, to illustrate a light path on which light generated by the light-emitting element 132 is transmitted outward.

As shown in FIG. 5, the light generated by the light-emitting element 132 sequentially passes through the second light diffusion layer 170, the first light diffusion layer 150, and the first light-transmitting hole 112 and the second light-transmitting hole 114 on the housing 110, and then is transmitted outward. Light R1 vertically emitted upward by the light-emitting element 132 toward the first light-transmitting hole 112 penetrates the second light-transmitting region 172 of the second light diffusion layer 170 and is transmitted to the first semi-transparent region 154 of the first light diffusion layer 150. After the first semi-transparent region 154 scatters the light R1 outward to reduce intensity of the light R1, the light R1 is transmitted outward through the first light-transmitting hole 112. Light R2 obliquely emitted by the light-emitting element 132 toward the second light-transmitting hole 114 is transmitted to the second semi-transparent region 174 of the second light diffusion layer 170. After intensity of the light R2 is reduced by the second semi-transparent region 174, the light R2 passes through the first light-transmitting region 152 of the first light diffusion layer 150, and is transmitted outward through the second light-transmitting hole 114.

It can be seen from this that both the light R1 passing through the first light-transmitting hole 112 and the light R2 passing through the second light-transmitting hole 114 need to pass through semi-transparent regions. The semi-transparent regions reduce the intensity of the light, and improve uniformity of the light passing through each light-transmitting hole. In this manner, the light transmitted outward from the first light-transmitting hole 112 and the second light-transmitting hole 114 is ensured with uniform light-emitting brightness, so as to ensure image quality of a light-emitting pattern generated by the light-emitting unit A on the housing 110.

In the embodiment of FIG. 5, the second light diffusion layer 170 is located between the first light diffusion layer 150 and the light-emitting element 132. However, the disclosure is not limited thereto. According to actual requirements, positions of the first light diffusion layer 150 and the second light diffusion layer 170 are interchangeable, to generate similar effects.

Figure 6:
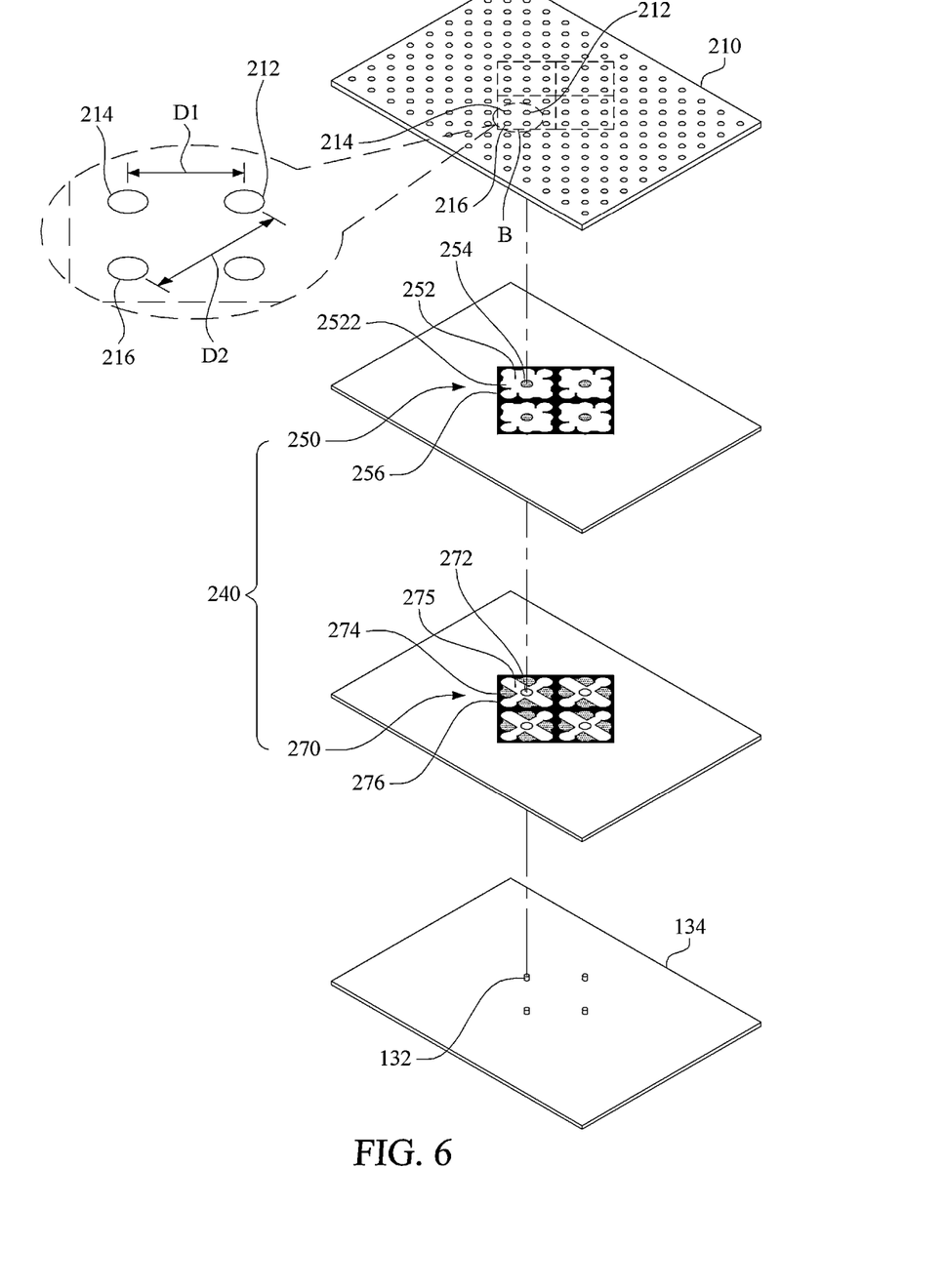
FIG. 6 is an exploded view showing another embodiment of an internal structure of a light-emitting unit of an electronic device according to the disclosure.

FIG. 6 is an exploded view showing another embodiment of an internal structure of a light-emitting unit B of an electronic device according to the disclosure. In the figure, four light-emitting units B are used as an example, and the quantity of light-emitting units B is adjustable according to requirements.

A plurality of light-emitting elements 132 are located in a housing 210, and are arranged in an array on a circuit board 134. The light-emitting units B each correspond to a light-emitting element 132. Each light-emitting unit B corresponds to a first light-transmitting hole 212 on the housing 210, at least one second light-transmitting hole 214 adjacent to the first light-transmitting hole 212, and at least one third light-transmitting hole 216 adjacent to the first light-transmitting hole 212.

In an embodiment, each light-emitting unit B corresponds to one first light-transmitting hole 212, four second light-transmitting holes 214 surrounding the first light-transmitting hole 212, and four third light-transmitting holes 216 surrounding the first light-transmitting hole 212. A first distance D1 exists between the first light-transmitting hole 212 and the second light-transmitting hole 214, and a second distance D2 exists between the first light-transmitting hole 212 and the third light-transmitting hole 216, the first distance D1 being smaller than the second distance D2.

It is worth noting that the quantity of second light-transmitting holes 214 and the quantity of third light-transmitting holes 216 corresponding to a single light-emitting unit described above is only an example in the disclosure. The disclosure is not limited thereto. The quantities depend on an actual situation (such as density and distribution manners of required light-transmitting holes, intensity of a single light source, or the like).

In an embodiment, as shown in FIG. 6, the first light-transmitting holes 212, the four second light-transmitting holes 214, and the four third light-transmitting holes 216 corresponding to each light-emitting unit B define a square region. The first light-transmitting hole 212 is located at the center of the square region, the second light-transmitting holes 214 are located at the corners of the square region, and the third light-transmitting holes 216 are each located at a middle position on each side of the square region.

The light diffusion structure 240 includes a first light diffusion layer 250 and a second light diffusion layer 270. The first light diffusion layer 250 is disposed between the housing 210 and the light-emitting element 132. The first light diffusion layer 250 includes a first light-transmitting region 252, a first semi-transparent region 254 and a first light-shielding region 256.

The first semi-transparent region 254 corresponds to the first light-transmitting hole 212, and the first light-shielding region 256 surrounds the first semi-transparent region 254. The first light-transmitting region 252 is located between the first semi-transparent region 254 and the first light-shielding region 256, and corresponds to the second light-transmitting hole 214 and the third light-transmitting hole 216.

In an embodiment, the first semi-transparent region 254 is a circular region, and is aligned with the first light-transmitting hole 212. The first light-transmitting region 252 includes eight circular regions 2522 aligned with the four second light-transmitting holes 214 and four third light-transmitting holes 216 respectively. The eight circular regions 2522 are connected to each other, or independent of each other.

In an embodiment, the second light diffusion layer 270 is disposed between the first light diffusion layer 250 and the light-emitting element 132. The second light diffusion layer 270 includes a second light-transmitting region 272, a second semi-transparent region 274, a third light-transmitting region 275, and a second light-shielding region 276.

The second light-transmitting region 272 corresponds to the first light-transmitting hole 212. The second semi-transparent region 274 corresponds to the second light-transmitting hole 214 and surrounds the second light-transmitting region 272, and the second light-shielding region 276 surrounds the second semi-transparent region 274. The third light-transmitting region 275 corresponds to the third light-transmitting hole 216. The second light-shielding region 276 surrounds the third light-transmitting region 275.

In an embodiment, the second light-transmitting region 272 and the third light-transmitting region 275 form an X-shaped region as a whole. The X-shaped region extends from a position corresponding to the first light-transmitting hole 212 toward positions of the four surrounding third light-transmitting holes 216. The second light-shielding region 276 is a square frame surrounding the X-shaped region. The second semi-transparent region 274 is located between the second light-shielding region 276 and the X-shaped region.

Figure 7:
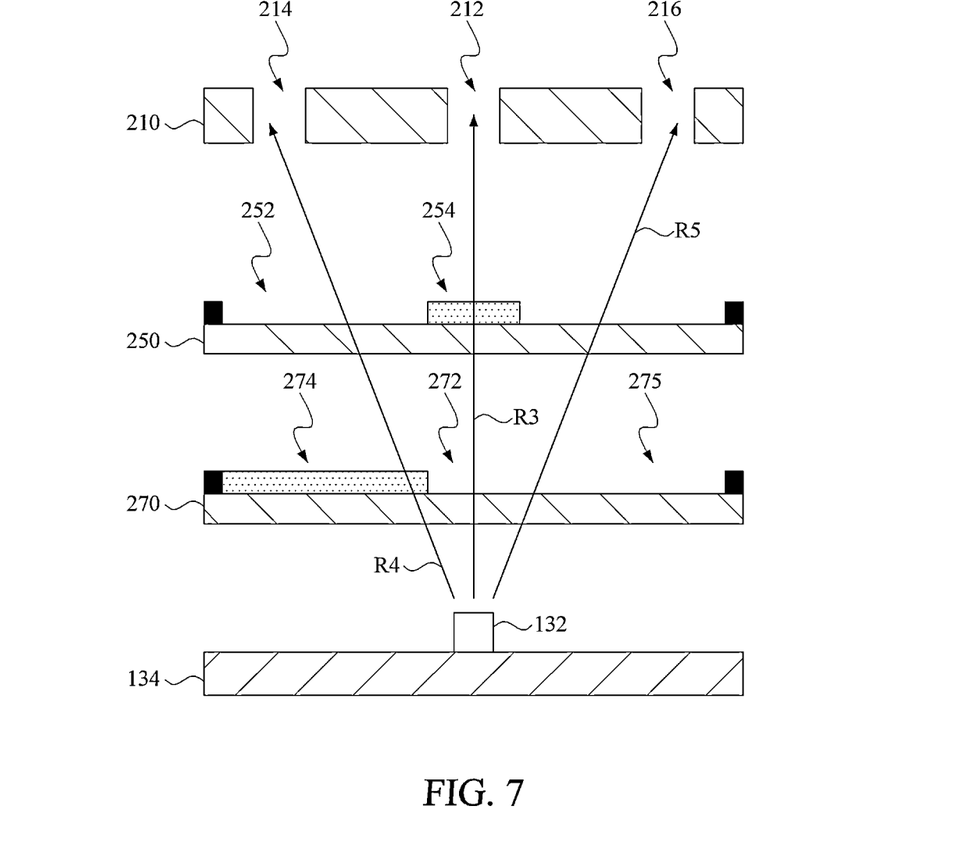
FIG. 7 is a cross-sectional view showing an internal structure and a light path of the light-emitting unit in FIG. 6.

FIG. 7 is a cross-sectional view showing an internal structure of the light-emitting unit B in FIG. 6, to illustrate a light path on which light generated by the light-emitting element 132 is transmitted outward.

As shown in FIG. 7, the light generated by the light-emitting element 132 sequentially passes through the second light diffusion layer 270, the first light diffusion layer 250, and the first light-transmitting hole 212, the second light-transmitting hole 214, and the third light-transmitting hole 216 on the housing 210, to be transmitted outward.

Light R3 vertically emitted upward by the light-emitting element 132 toward the first light-transmitting hole 212 penetrates the second light-transmitting region 272 of the second light diffusion layer 270 and is transmitted to the first semi-transparent region 254 of the first light diffusion layer 250. After the first semi-transparent region 254 scatters the light R3 outward to reduce intensity of the light R3, the light R3 is transmitted outward through the first light-transmitting hole 212.

Light R4 obliquely emitted by the light-emitting element 132 toward the second light-transmitting hole 214 is transmitted to the second semi-transparent region 274 of the second light diffusion layer 270. After being scattered and weakened by the second semi-transparent region 274, the light R4 passes through the first light-transmitting region 252 of the first light diffusion layer 250, and is transmitted outward through the second light-transmitting hole 214.

Light R5 emitted by the light-emitting element 132 toward the third light-transmitting hole 216 passes through the third light-transmitting region 275 of the second light diffusion layer 270 and the first light-transmitting region 252 of the first light diffusion layer 250, and then is transmitted outward through the third light-transmitting hole 216.

It can be seen from this that both the light R3 passing through the first light-transmitting hole 212 and the light R4 passing through the second light-transmitting hole 214 need to pass through semi-transparent regions. The semi-transparent regions reduce the intensity of the light, and improve uniformity of the light passing through each light-transmitting hole. In this manner, the light transmitted outward from the first light-transmitting hole 212 and the second light-transmitting hole 214 is ensured with uniform light-emitting brightness.

Because a first distance D1 between the first light-transmitting hole 212 and the second light-transmitting hole 214 is smaller than a second distance D2 between the first light-transmitting hole 212 and the third light-transmitting hole 216, a distance by which the light R5 travels from the light-emitting element 132 (which is regarded as a point light source) to the third light-transmitting hole 216 is greater than a distance by which the light R4 travels from the light-emitting element 132 to the second light-transmitting hole 214.

Because the light R5 emitted by the light-emitting element 132 to the third light-transmitting hole 216 through the third light-transmitting region 275 experiences less intensity reduction than the light R4 emitted by the light-emitting element 132 to the second light-transmitting hole 214 through the second semi-transparent region 274, which makes up for a difference between travel distances of the light, the second light-transmitting hole 214 and the third light-transmitting hole 216 have uniform light-emitting brightness, so as to ensure image quality of the light-emitting pattern generated by the light-emitting unit B in the housing 210.

In the foregoing embodiments, the first light diffusion layer 150/250 and the second light diffusion layer 170/270 each have a light-shielding pattern layer 158/178 to form the first light-shielding region 156/256, and the second light-shielding region 176/276 at the edge of the light-emitting unit A/B, preventing adjacent light-emitting units A/B from interfering with each other. However, the disclosure is not limited thereto. In other embodiments, if a sufficient distance exists between the light-emitting units A/B, the light-shielding pattern layer 158/178 is omitted.

The electronic device according to the disclosure uses the first light diffusion layer 15/250 and the second light diffusion layer 170/270 to effectively disperse light generated by the light-emitting element 132 to the first light-transmitting hole 112/212 and the second light-transmitting hole 114/214, to transmit the light outward. In this manner, the quantity of light-emitting elements 132 can be reduced while ideal image quality is achieved. In addition, an excessively high internal temperature of a system caused by excessive light-emitting elements 132 is also avoided, and the manufacturing cost is also reduced.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An electronic device, comprising:
   a housing, comprising a first light-transmitting hole and a second light-transmitting hole;
   a light-emitting element, disposed in the housing, and aligned with the first light-transmitting hole; and
   a light diffusion structure, comprising:
      a first light diffusion layer, disposed between the housing and the light-emitting element, and comprising a first semi-transparent region and a first light-shielding region, wherein the first semi-transparent region corresponds to the first light-transmitting hole, and the first light-shielding region surrounds the first semi-transparent region; and
      a second light diffusion layer, disposed between the housing and the light-emitting element, and comprising a second semi-transparent region and a second light-shielding region, wherein the second semi-transparent region corresponds to the second light-transmitting hole, and the second light-shielding region surrounds the second semi-transparent region.

2. The electronic device according to claim 1, wherein the first light diffusion layer further comprises a first light-transmitting region located between the first semi-transparent region and the first light-shielding region.

3. The electronic device according to claim 1, wherein the second light diffusion layer further comprises a second light-transmitting region, the second light-transmitting region corresponds to the first light-transmitting hole, and the second semi-transparent region surrounds the second light-transmitting region.

4. The electronic device according to claim 1, wherein the first light diffusion layer comprises a light-shielding pattern layer and a semi-transparent reflective pattern layer, the light-shielding pattern layer defines the first light-shielding region, and the semi-transparent reflective pattern layer defines the first semi-transparent region.

5. The electronic device according to claim 4, wherein the light diffusion structure comprises a first light-transmitting film, the light-shielding pattern layer and the semi-transparent reflective pattern layer are located on opposite sides of the first light-transmitting film.

6. The electronic device according to claim 4, wherein the semi-transparent reflective pattern layer is a silver ink layer.

7. The electronic device according to claim 4, wherein the light-shielding pattern layer is a black ink layer.

8. The electronic device according to claim 1, wherein the second light diffusion layer comprises a light-shielding pattern layer and a semi-transparent pattern layer, the light-shielding pattern layer defines the second light-shielding region, and the semi-transparent pattern layer defines the second semi-transparent region.

9. The electronic device according to claim 8, wherein the light diffusion structure comprises a second light-transmitting film, the light-shielding pattern layer and the semi-transparent pattern layer are located on opposite sides of the second light-transmitting film.

10. The electronic device according to claim 8, wherein the semi-transparent pattern layer is a white ink layer.

11. The electronic device according to claim 8, wherein the light-shielding pattern layer is a black ink layer.

12. The electronic device according to claim 1, wherein the housing further comprises a third light-transmitting hole, a first distance between the first light-transmitting hole and the second light-transmitting hole is smaller than a second distance between the first light-transmitting hole and the third light-transmitting hole.

13. The electronic device according to claim 12, wherein the second light diffusion layer further comprises a second light-transmitting region and a third light-transmitting region, the second light-transmitting region corresponds to the first light-transmitting hole, the third light-transmitting region corresponds to the third light-transmitting hole, the second semi-transparent region surrounds the second light-transmitting region, and the second light-shielding region surrounds the third light-transmitting region.

14. The electronic device according to claim 1, wherein the light diffusion structure comprises a light-transmitting film, the first light diffusion layer and the second light diffusion layer are located on opposite sides of the light-transmitting film.

* * * * *